Jan. 17, 1956     V. B. KORIAGIN     2,730,777
CANOPY MOUNTING
Filed May 15, 1951
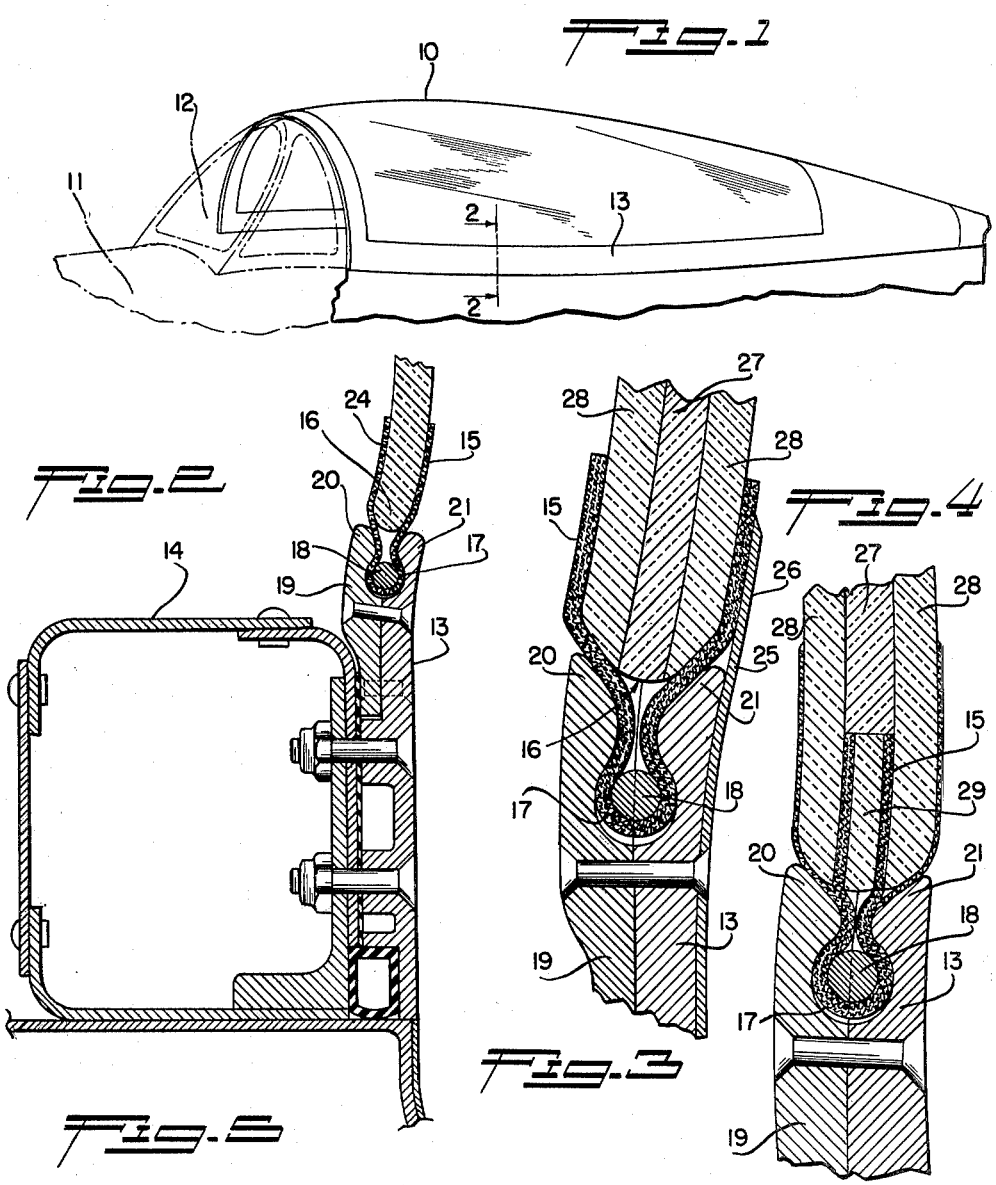
INVENTOR.
VSEVOLOD B. KORIAGIN
BY
George C. Sullivan
Agent _United States Patent Office_

2,730,777
Patented Jan. 17, 1956

2,730,777

CANOPY MOUNTING

Vsevolod B. Koriagin, Glendale, Calif., assignor to Lockheed Aircraft Corporation, Burbank, Calif.

Application May 15, 1951, Serial No. 226,411

7 Claims. (Cl. 20—56.4)

This invention relates to an improved mounting edge arrangement for airplane cockpit canopies and the like in frames therefor that are normally fixed to and/or slidable, hinged, or removable from the airplane fuselage structure itself.

Materials used for such transparent canopies are usually formed from monolithic or laminated sheets of acrylic, polyester, or other transparent plastic or synthetic resin materials, the exact composition of which is immaterial to the present invention which relates to the attachment of such formed transparent canopies to a suitable frame providing for removal or opening of the canopy with its frame to permit entrance and exit of personnel into and from the cockpit of an airplane; the canopy forming a sealed cover for the cockpit when its frame is clamped and sealed to the airplane structure surrounding the cockpit therein.

Transparent canopies of the type described are subject to thermal shocks when in use, together with the aerodynamic load, and internal pressure differentials. Present types of mountings attempt to strengthen or reinforce the edges of the canopy material to position the mounting bolts in the reinforced edge, and while test coupons of such reinforced edges develop satisfactory strengths, the service life of the canopies has been short and unpredictable, due to crazing of the canopy material, such crazing being the cause of rejection or replacement because it leads to early failure or blowout of the canopy in flight. I have discovered that the basic cause of such premature and unpredictable failures at apparent stresses greatly below those developed by laboratory test coupons, is primarily due to the locked in thermal stresses developed because the canopy materials have a thermal coefficient of expansion of about four times that of the aluminum frame so that a strong and rigid edge reinforcement of the canopy material causes a concentration of stress resulting in canopy failure adjacent the transition point between the reinforcing material and the balance of the canopy. In tests, it has been found that a canopy mounted in its frame while at a room temperature of about 70° F. will develop internal stresses in the canopy adjacent the joint of as much as 1700 p. s. i. when tested at the extremes of operational temperatures, namely minus 60 to plus 130° F. due to the restraint imposed on the canopy expansion or contraction by the frame, acting through the usual rigid edge reinforcement of the canopy. The normal operational loads including aerodynamic and cockpit internal pressurization, as well as any distortion or working of the cockpit structure and canopy frame, are thus superimposed upon the internal thermal stresses, which latter are also in the nature of thermal shock loads because of rapid temperature changes as the airplane climbs or descends from high altitudes, as when the airplane moves between a hot desert airfield and the steady cold of high altitudes.

It is accordingly a principal object of this invention to provide a canopy edge attachment of adequate strength to sustain the canopy loads vertically across the joint to the frame, while being flexible both traversely and longitudinally of the joint, which forms in effect a longitudinally expansible hinge joint; the longitudinal freedom of movement between the canopy and its frame relieving the internal thermal stresses developed by differential expansion or contraction of the canopy relative to its frame. The transverse flexibility or hinge effect also relieves the canopy of bending stresses at its connection to the frame, thus further reducing the tendency of the canopy material to craze adjacent the frame.

It is a further important object of this invention to provide a canopy edge attachment of strong, predominately unidirectional cord or fabric material cemented to the canopy, wherein the strong or predominate lay or warp of one or more layers of the fabric is disposed normal to the edge of the canopy in the form of a loop to form a hinge-like attachment to the frame, the predominate or unidirectional lay or warp being relatively unstretchable while the weaker lay or woof of the fabric runs parallel to the edge of the canopy and readily permits longitudinal or edge-wise flexure of the dominate lay or cords running normal to the edge, to permit the canopy edge to expand or contract longitudinally of its frame.

It is another important object of this invention to provide a canopy to frame joint eliminating bolt holes through either the canopy or the reinforcing edge material thereon to simplify the canopy mounting by positioning a continuous rod-like member in a loop formed in the fabric reinforcing material, the canopy frame being provided with a conforming edge embracing the fabric loop and clamping through the fabric against the rod-like member to form a neck in the fabric loop between the member and the edge of the canopy material.

Other objects and features of the invention will be readily understood from the following detailed description of a typical preferred form of the invention wherein reference will be made to the accompanying drawings in which:

Figure 1 is a fragmentary perspective view of an airplane windshield and canopy illustrating the application of this invention to the canopy edge;

Figure 2 is an enlarged section on the line 2—2 of Figure 1 showing a joint between the canopy and its frame embodying the features of this invention where a monolithic canopy material is used;

Figure 3 is a further enlarged section similar to Figure 2 wherein a laminated canopy material is used;

Figure 4 is a modification of the joint of Figure 3; and

Figure 5 is a schematic detail of the predominately unidirectional fabric preferred for use in forming the canopy to frame joint of this invention.

I have chosen to illustrate my invention in connection with a transparent canopy 10 of the type presently used in fighter-type aircraft 11 wherein a windshield 12 is fixedly mounted to the aircraft structure, and a canopy frame 13 is either slidable rearwardly or hinged at the rear to open upwardly at the front end adjacent the windshield, for pilot entrance and exit. Such airplanes have pressurized cockpits for high altitude operation so that the canopy frame 13 carries an inflatable rubber tube 14, which acts to seal the joint between the frame 13 and the airplane structure 10.

The foregoing structure forms no part of my invention and is described herein by way of background; since the canopy attachment to its frame, which incorporates my invention, has heretofore progressed from a direct bolted attachment, to high strength edge reinforcements cemented to the canopy and in turn bolted to the frame 13. Examples of the latter arrangements are disclosed in the application of Eugene H. Snyder, Serial No. 646,308, filed February 8, 1946, Patent Number 2,696,451, issued December 7, 1954, entitled Plastic Edge Attachment. As disclosed in the Snyder application the reinforced edge, built up of laminated cloth and/or fibre glass fabric, could be made so much stronger than the transparent canopy material that in spite of the bolt holes in the reinforcement it could still develop the full strength of the canopy material in tension tests.

In service, however, the canopy material would craze on the canopy side of the joint, which crazing would either be the cause of rejection if discovered in time, or of eventual failure of the canopy itself. I have found that such failures develop because of high internal stresses developed parallel to the joint because of the dissimilar expansion characteristics of the transparent canopy material and that of the frame therefor, the canopy material having an expansion approximating four times that of aluminum. Thus a canopy having a longitudinally stiff connection with its frame has developed as much as 1700 p. s. i. internal stress over a major part of the length of the side joint when assembled at room temperature and then subjected to extreme operating temperatures, ranging from plus 130 to minus 60° F. Such a test produces stress reversal in passing from one temperature extreme to the other in simulating operation, as from a hot airfield to the extreme cold of high altitude, or vice versa. In actual operation this reversal of high internal stress appears to resemble thermal shock, as the maximum temperature change can occur in a matter of minutes with present day high performance airplanes.

My invention contemplates forming a hinge-like joint between the canopy edge and the frame therefor, which joint will be of adequate strength normal or perpendicular to the hinge line, while flexible longitudinally of the hinge axis to permit the canopy material to expand or contract longitudinally of the joint, thus relieving the internal thermal stresses which have heretofore been superimposed on the operational loads, comprising aerodynamic and cockpit pressurization bursting stresses.

I provide such a longitudinally expansible and contractible hinge-like joint by cementing one or more layers of strong fabric 15 to the edge 16 of the canopy material, leaving a free loop 17 of fabric extending beyond the end of the canopy edge, and inserting a rod 18 in the loop. A member 19 is attached to the canopy frame 13 and forms one jaw 20 while a second detachable member forms a second jaw 21, the two jaws embracing and gripping the fabric loop 17 about the rod 18 therein. The gripping parts of the jaws 20 and 21 are curved to distribute the clamping stress over the fabric loop 17 between the rod 18 and the canopy edges 16, and to allow a slight pivotal or hinge motion of the canopy relative to the rigid frame.

Various strong fabric materials are suitable for use in forming the loop of this invention, such as fibre-glass, nylon and Orlon, for example. One or more layers of such fabric may be cemented or laminated to the canopy edge by presently known cementing techniques which form no part of the present invention. Preferably the loop portion is not impregnated with the cement as flexibility is desired therein but the loop may be impregnated with a flexible or rubber-like cement or resin to aid in retaining the cockpit seal under pressurization.

Preferably, the fabric is so woven as to have a predominate or unidirectional lay resembling cord fabric, as schematically shown in Figure 5, wherein the strong warp threads or cords 22 are disposed perpendicular to the joint, and weaker woof threads 23 permit flexibility in the loop along the joint. The cords 22 thus carry the load across the joint, while the woof threads 23 maintain the general alignment of the individual cord loops, while permitting flexing or bending thereof due to movement of the canopy longitudinally of the hinge line.

The form of the invention shown in Figure 2 is suitable for use with a monolithic transparent canopy 10 wherein the fabric loop 17 is formed by cementing the edges 24 of the fabric 15 to the opposite faces of the canopy adjacent the edge 16 thereof, the cement being applied only to the overlap between the fabric and canopy edge, preferably leaving the free loop 17 unimpregnated with the cement used to impregnate the fabric in contact with the canopy material, unless the cement used is sufficiently flexible to permit loop flexure. It will be noted that the corners 25 of the canopy edge 16 have been beveled off to conform to the natural curve of the loop when the jaws 20 and 21 are clamped about the rod 18 positioned in the loop.

The versions of Figures 3 and 4 show the use of the mounting of this invention when used with a laminated type of canopy material 10$^a$. Figure 3 corresponds to the showing of Figure 2, but further shows a fairing strip 26 applied to the outside of the frame member 19 to restrain outward movement or bulging of the canopy edge when under internal pressure. Such a fairing can desirably be applied to any of the showings.

Figure 4 shows a variation of the fabric loop particularly suitable for use with laminated types of canopies, wherein the canopy interlayer 27 is cut back from the edge and the ends of one or more loops 17$^a$ of fabric cemented against the inner faces of the surface layers 28 of the canopy with a spacer 29 inserted and cemented between the loop ends. One or more additional loops 17 of fabric are applied over the outside of the loops 17$^a$ and cemented to the outer faces of the surface layers 28 of the canopy in the same way as in Figures 2 and 3, being carried up the sides of the canopy edge to substantially overlap the ends of the cut back interlayer for reinforcement of the butt joint at the edge of the remaining interlayer.

An example of a mounting edge of the type of Figure 4 utilizes an inner loop 17$^a$ built up to approximately .045 inch cemented edge thickness, with an outer loop 17 of approximately .025 thickness, for a canopy approximating a half inch in thickness. This example used nylon as the fabric, but Orlon or fibre-glass could be used, with due allowance for any difference in strength. If fibreglass were to be used it would be especially desirable to impregnate the loop part with a flexible or rubber-like binder to reduce fraying tendencies as well as to seal the hinge area against pressurization of the canopy. I prefer to use nylon or Orlon fabric because these materials have nearly the same coefficient of thermal expansion as those of the usual canopy materials, so that such fabrics can be cemented to the canopy without detrimental effects due to differential expansion.

To summarize the preparation and operation of the canopy joint of my invention, the fabric loops 17 are cemented to the canopy edges, and when ready to assemble in the canopy frame 13 a rod 18 is inserted in the fabric loops and the jaws 20 and 21 clamped about the fabric enclosed rod. This operation is normally performed at room temperature, about midway between the operating temperature extremes. The canopy attachment to its frame will be subjected to both internal pressurization and aerodynamic stresses and shrinkage relative to its frame at the low temperatures of high altitude flight, and to expansion and aerodynamic stresses under high temperature conditions near the ground. Such shrinkage or expansion would produce thermal differential strains between the canopy and its frame if the attachment were rigid, but my invention relieves such strains because the fabric loops are not restrained and are free to bend longitudinally or transversely or slide along the rod 18 in the jaws 20 and 21. Internal pressurization and external air loads may induce friction in the jaws, which is, however, largely cancelled out by the flexibility of the loops of fabric.

Having described only typical forms of the invention I do not wish to be limited to the specific details herein set forth, but wish to reserve to myself any variations or modifications that may appear to those skilled in the art and fall within the scope of the following claims.

I claim:

1. An aircraft enclosure and mounting therefor adapted to compensate for differential thermal expansion between the enclosure and a frame therefor, comprising a transparent body sheet formed of a synthetic resin and having a marginal edge, an attaching strip for mounting said enclosure comprising a loop of fabric forming an aligned extension of said edge, said loop having marginal edges which conform to and overlap and are cemented to the marginal edge of said body sheet whereby to provide a flexible extension in the plane of said body sheet, a rod inserted through said loop of fabric in spaced relationship to the marginal edge of the body sheet, and mounting means for said body sheet comprising parallel jaws aligned with the plane of the body sheet and engaging the loop of fabric between the rod and the marginal edge of the body sheet.

2. An aircraft enclosure and mounting therefor adapted to compensate for differential thermal expansion between the enclosure and a frame therefor, comprising a transparent body sheet formed of a synthetic resin and having a marginal edge, an attaching strip for mounting said enclosure comprising a loop of predominately unidirectional cord-like fabric, the lay of which is normal to the axis of the loop, said loop having marginal edges which conform to and overlap and are cemented to the marginal edge of said body sheet, whereby to provide a flexible extension in the plane of said body sheet, a rod inserted through said loop of fabric in spaced relationship to the marginal edge of the body sheet and mounting means for said body sheet comprising parallel jaws aligned with the plane of the body sheet and engaging the loop of fabric between the rod and the marginal edge of the body sheet.

3. An aircraft enclosure and mounting therefor adapted to compensate for differential thermal expansion between the enclosure and a frame therefor, comprising a transparent body sheet formed of a synthetic resin and having a marginal edge, an attaching strip for mounting said enclosure comprising a loop of predominately unidirectional cord-like fabric the lay of which is normal to the axis of the loop, said loop having marginal edges which conform to and overlap and are cemented to the marginal edge of said body sheet, the loop being spaced from the marginal edge of the body sheet, whereby to provide a flexible extension in the plane of said body sheet.

4. An aircraft enclosure and mounting therefor adapted to absorb differential thermal expansion between the enclosure and a frame therefor, comprising a transparent body formed of a synthetic resin and having a marginal edge of predetermined shape, an attaching strip for mounting said enclosure comprising a loop of fabric having marginal edges which conform to, which overlap, and which are cemented to the marginal edge of said body, the loop of the fabric being in spaced relation to the edge of said body, a rod disposed in said fabric loop, and a mounting frame for said enclosure having parallel jaws aligned with the plane of the body sheet and which conform to said fabric loop adjacent the rod therein and engage the fabric between said rod and the marginal edge of the body.

5. An aircraft enclosure and mounting therefor adapted to absorb differential thermal expansion between the enclosure and a frame therefor, comprising a transparent body formed of a synthetic resin and having a marginal edge of predetermined shape, an attaching strip for mounting said enclosure comprising a loop of cord-like fabric the lay of which is normal to the axis of the loop, said loop having marginal edges which conform to, which overlap, and which are cemented to the marginal edge of said body, the loop of the fabric being in spaced relation to the edge of said body, a rod disposed in said fabric loop, and a mounting frame for said enclosure having parallel jaws aligned with the plane of the body sheet and which conform to said fabric loop adjacent the rod therein, and engage the fabric between said rod and the marginal edge of the body.

6. An aircraft enclosure and mounting therefor adapted to absorb differential thermal expansion between the enclosure and a frame therefor, comprising a transparent body formed of a synthetic resin and having a marginal edge of predetermined shape, and an attaching strip for mounting said enclosure comprising a loop of cord-like fabric the dominant lay of which is normal to the axis of the loop, said fabric having marginal edges which conform to, which overlap, and which are cemented to the marginal edge of said body, the loop of the fabric being in spaced relation to the edge of said body.

7. An aircraft enclosure adapted to resist internal pressures and to absorb differential thermal expansion relative to its frame, comprising, as mating parts, a transparent body formed of a synthetic resin and having a marginal edge of predetermined shape, and a strip for mounting said body to a frame therefor which strip is yieldable lengthwise of the marginal edge of the body, said strip comprising a loop formed from at least one layer of cord-like fabric, the dominant lay of the cords being normal to the strip of fabric, the marginal edges of which loop being cemented in overlapping relationship to the marginal edge of said body.

References Cited in the file of this patent

UNITED STATES PATENTS

| | | |
|---|---|---|
| Re. 19,847 | Springer | Feb. 4, 1936 |
| 1,963,393 | Woodall | June 19, 1934 |
| 2,293,656 | McClain | Aug. 18, 1942 |
| 2,367,075 | Ulmer et al. | Jan. 9, 1945 |
| 2,368,911 | Andler | Feb. 6, 1945 |
| 2,409,808 | Sowle | Oct. 22, 1946 |
| 2,511,168 | Martin et al. | June 13, 1950 |
| 2,576,734 | Voelker | Nov. 27, 1951 |
| 2,612,333 | Wood | Sept. 30, 1952 |
| 2,659,462 | Schwartz et al. | Nov. 17, 1953 |